LIGHT REFLECTIVE PHOTOELECTRIC TAPE SENSOR SYSTEM

Filed March 2, 1964 2 Sheets-Sheet 1

INVENTOR
MAX WEISSBACH
BY
Douglas M. Clarkson
ATTORNEY

LIGHT REFLECTIVE PHOTOELECTRIC TAPE SENSOR SYSTEM

Filed March 2, 1964 2 Sheets-Sheet 2

INVENTOR
MAX WEISSBACH

BY Douglas M. Clarkson
ATTORNEY

United States Patent Office 3,308,301
Patented Mar. 7, 1967

3,308,301

LIGHT REFLECTIVE PHOTOELECTRIC TAPE SENSOR SYSTEM

Max Weissbach, 23 Cornell Drive, Plainview, N.Y. 11803

Filed Mar. 2, 1964, Ser. No. 348,719
3 Claims. (Cl. 250—219)

This invention, generally, relates to magnetic tape handler apparatus and, more particularly, to a device for sensing presence or absence of tape.

It is a primary object of the invention to provide a device for preventing the operation of pinch rollers, servo motors, brakes and the like on a magnetic tape transport apparatus in the event that tape is no longer present along its normal path due, for example, to tape breakage or tape being fully rewound on one of the reels.

Already present on most tape transport apparatus is a photoelectric tape sensor system which, by means of reflective mirror strips about 1" long and 7/32" wide applied to the back of the tape and along either edge, will cause tape motion to stop at the beginning or end of the tape supply with sufficient tape remaining on the opposite reel to permit reversal of the direction of tape motion.

The present invention, briefly, provides a reflective mirror surface on the opposite side of the tape path from the photoelectric tape sensor system so that radiation from a radiation source is reflected to a radiation detection means for indicating that no tape is present.

The invention will be understood more fully from the following description of a preferred form referring to the accompanying drawings, in which.

Figures 1, 2:
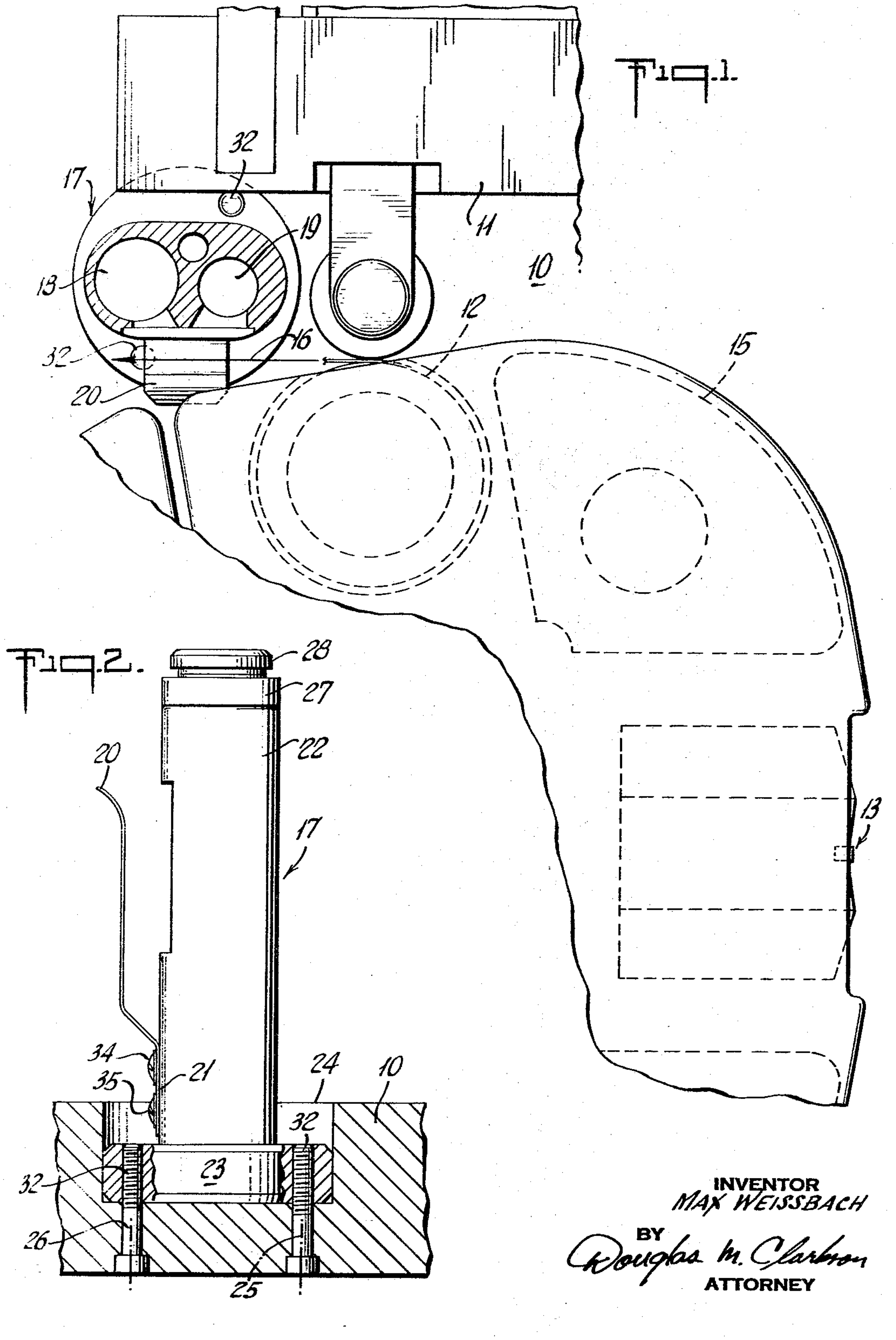
FIG. 1 is a front view of a partial panel for a tape transport apparatus.
FIG. 2 is a side view, in elevation, of a sensor system in accordance with the invention.

Referring now to FIG. 1 of the drawings, the panel of a tape loop transport apparatus is indicated generally by the numeral 10, and a suitable pinch roller mechanism 11 is affixed to the panel 10 in a customary manner to pinch tape against a rotating capstan 12 for causing tape (not shown) to be pulled across an information processing station 13, around tape guides 14 and 15 to be moved along a path indicated by an arrow 16.

Photoelectric tape sensor system 17 is supported on the panel 10 in a position contiguous with the pinch roller mechanism 11 so that reflective mirror strips placed in predetermined positions on a magnetic tape will cause radiation from a suitable radiation source positioned in a chamber 18 to be reflected in the direction of radiation detection means positioned in a chamber 19. In accordance with the present invention, a reflective mirror surface is positioned on the opposite side of the tape path indicated by the arrow 16 from the sensor system 17 so that when tape is absent from the path, the radiation will be reflected to the detection means in the chamber 19.

FIG. 2 shows the photoelectric tape sensor system 17 in elevation and shows that the reflective mirror surface 20 is supported at 21 directly on the housing 22 of the sensor system 17. The housing 22 has an enlarged circular flange 23 at its lower end for fitting within a matching opening 24 in the panel 10 and is attached fixedly by means of bolts at the positions 25 and 26.

Figures 3, 4, 5:
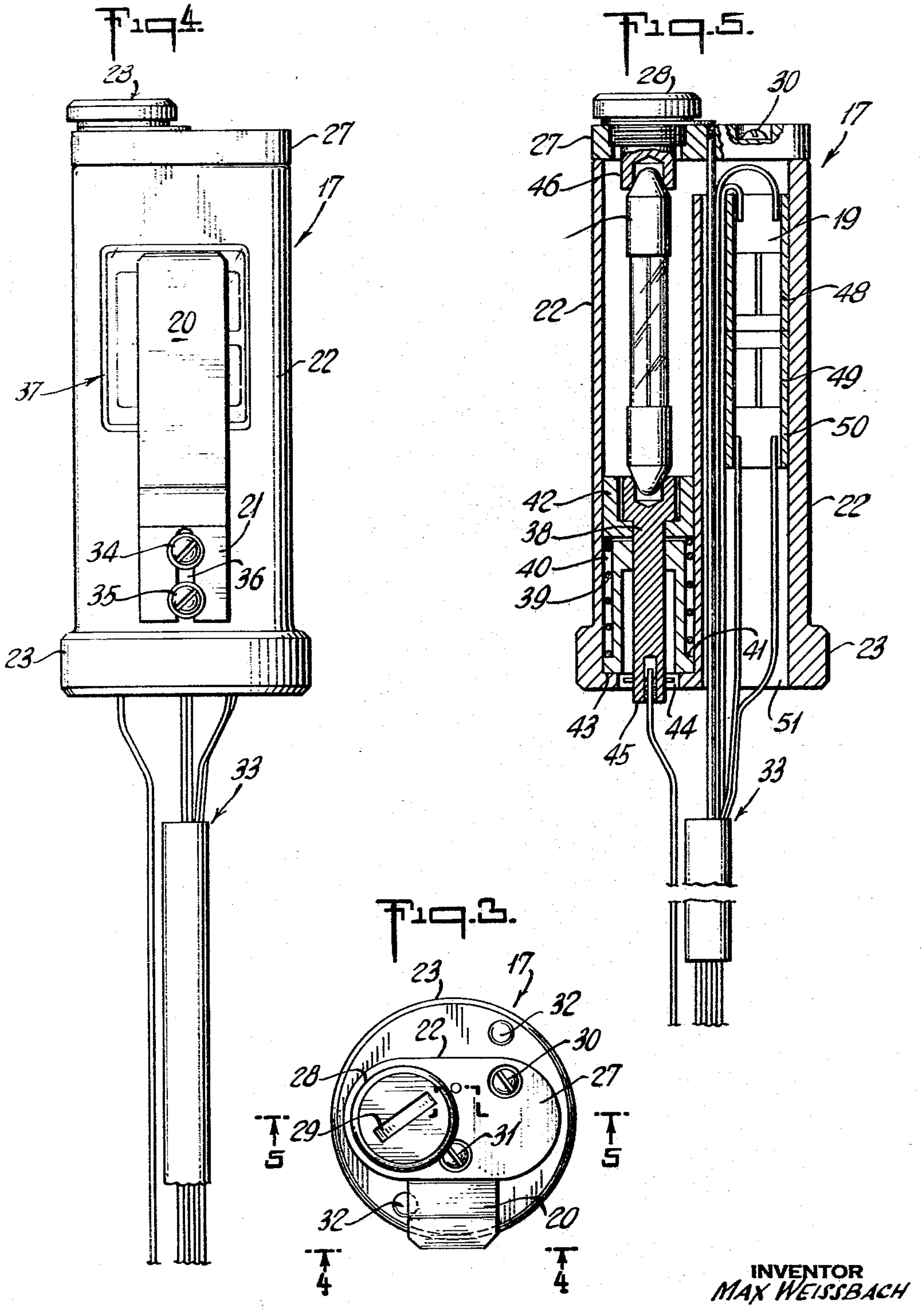
FIG. 3 is a top view of the system shown in FIG. 2.
FIG. 4 is a front view taken along the line 4—4 in FIG. 3.
FIG. 5 is a view in cross-section taken along the line 5—5 in FIG. 3.

FIG. 3 shows a top view of the sensor system 17 and shows that the top end 27 of the housing 22 is roughly ovaled in configuration. A threaded cap 28 with a screwdriver slot 29 permits easy access to the radiation source chamber 18.

However, the entire end 27 may be removed by unthreading two bolts 30 and 31. Also visible in FIG. 3 are bolts 32 and 33 which are positioned along the location lines 25 and 26 shown in FIG. 2 for attaching the housing 22 to the panel 10.

FIG. 4 shows a front view of the housing 22 along the line 4—4 in FIG. 3 and shows electrical leads indicated generally by the numeral 33 extending from the flange 23 for passing through the panel 10 to connect with appropriate electrical circuitry as will be understood. The reflective mirror surface 20 is affixed directly to the housing 22 by small bolts 34 and 35, and the lower most end of the reflective mirror surface 20 is bifurcated by the provision of a slot 36 so that the surface 20 may be adjusted vertically as desired.

The opening 37 is formed in the housing 22 so that radiation from the radiation source in the chamber 18 is reflected from a surface external to the housing 22 back into the chamber 19 through the same opening 37.

FIG. 5 shows the sensor system in cross-section along the line 5—5 in FIG. 3 and depicts the radiation source as an elongated type electric light bulb. A lower terminal 38 for the bulb is urged upwardly as viewed in FIG. 5 by a coil spring 39 acting in a space 40 between a shoulder 41 and a cup 42.

The shoulder 41 is retained in the housing 22 by a flange 43 formed by a smaller opening 44 through which the lower most end 45 of the terminal 38 extends. The cup 42 is formed to receive the upper end of the terminal 38.

The cap 28 is threaded into the end 27 of the housing 22 and has formed directly therewith an upper terminal 46. The threads 47 for the cap 28 are of sufficiently large diameter to permit an opening of suffiicient size for changing the radiation source when desired.

Two solar cells 48 and 49 are spaced apart vertically in the chamber 19 to provide the radiation detection means. These cells 48 and 49 are supported in a suitable capsule 50 permitting them to be assembled separately and inserted in the housing 22 up through an opening 51 in the flange 23.

The following claims are intended to define the vaild scope of this invention over the prior art and to cover all changes and modifications falling within the true spirit and valid scope of this invention.

What is claimed is:

1. In a magnetic tape handler apparatus for processing information including an information processing station, an opaque tape with a radiation reflective strip along one edge of the tape near one of its ends marking the beginning of the tape and another reflective strip along the other edge of the tape near its other end marking the end of the tape, a sensing device comprising;
   - a first radiation detector disposed on one side of the tape over one edge thereof,
   - a second radiation detector disposed on said one side of the tape over the other edge thereof,
   - a radiation source positioned on said one side of the tape,
   - a shield disposed between the radiation source and the first and second radiation detectors to limit the radiation arriving at the detectors to that from the direction of the tape,
   - a mirror having a reflective surface disposed on the side of the tape opposite said one side, whereby irradiation of said first detector indicates the beginning of the tape, irradiation of the second detector indicates the end of the tape, and irradiation of both of said detectors indicates the tape is missing.

2. In a magnetic tape handler apparatus for processing information including an information processing station, an opaque tape with a radiation reflective strip along one edge of the tape near one end thereof marking the beginning of the tape, and another reflective strip along the other edge of the tape near the other end thereof marking the end of the tape, a sensing device comprising;

a first light sensitive cell disposed on one side of the tape over one edge thereof, a second light sensitive cell disposed adjacent said first cell on said one side of the tape over the other edge of the tape, a lamp positioned on said one side of the tape, a housing having two bores therein, means for mounting said first and second cells in one of said bores, means for mounting said lamp in the other of said bores, said housing having windows along each of said bores disposed so as to limit the light arriving at said cells to that from the direction of the tape, a mirror having a reflective surface, and means to support the housing and the mirror so that the reflective surface is disposed on the opposite side of the tape from said lamp and said first and second cells, whereby irradiation of said first cell indicates the beginning of the tape, irradiation of the second cell indicates the end of the tape and irradiation of both of said cells indicates the tape is missing.

3. A sensor as in claim 2 wherein the means to support the mirror and the housing includes means affixing the mirror to the housing.

References Cited by the Examiner

UNITED STATES PATENTS

| | | | |
|---|---|---|---|
| 2,129,847 | 9/1938 | Knodel | 250—219 |
| 2,694,110 | 11/1954 | Roberts | 179—100.25 |
| 2,952,416 | 9/1960 | Sampson | 250—219 X |
| 2,971,716 | 2/1961 | Sampson | 250—219 X |
| 3,041,462 | 6/1962 | Ogle | 250—219 |
| 3,046,407 | 7/1962 | Hoffmann | 250—219 |
| 3,065,355 | 11/1962 | Barnes | 250—219 |
| 3,115,289 | 12/1963 | Namenyi-Katz | 179—100.25 |

WALTER STOLWEIN, *Primary Examiner.*